United States Patent
Tsaur et al.

(10) Patent No.: US 10,853,322 B1
(45) Date of Patent: Dec. 1, 2020

(54) SEARCH BUILT-IN AND COST EFFECTIVE DOCUMENT STORE AS A SERVICE

(71) Applicant: EMC IP Holding Company LLC, Hopkinton, MA (US)

(72) Inventors: Ynn-Pyng Tsaur, San Jose, CA (US); Derek Ding, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 306 days.

(21) Appl. No.: 15/498,920

(22) Filed: Apr. 27, 2017

(51) Int. Cl.
| G06F 16/17 | (2019.01) |
| G06F 16/93 | (2019.01) |
| G06F 16/176 | (2019.01) |
| G06F 16/28 | (2019.01) |
| G06F 16/242 | (2019.01) |

(52) U.S. Cl.
CPC ........ *G06F 16/1734* (2019.01); *G06F 16/176* (2019.01); *G06F 16/2445* (2019.01); *G06F 16/282* (2019.01); *G06F 16/93* (2019.01)

(58) Field of Classification Search
None
See application file for complete search history.

(56) References Cited

U.S. PATENT DOCUMENTS

| 8,473,515 | B2 * | 6/2013 | Cotner | G06F 16/256 707/782 |
| 8,606,790 | B2 * | 12/2013 | Weissman | G06F 16/2453 707/741 |
| 8,676,273 | B1 * | 3/2014 | Fujisaki | H04M 1/0202 455/567 |
| 8,826,444 | B1 * | 9/2014 | Kalle | G06F 21/552 726/26 |
| 10,248,355 | B2 * | 4/2019 | Cao | G06F 3/067 |
| 10,523,540 | B2 * | 12/2019 | Joshi | H04L 67/10 |
| 2018/0247241 | A1 * | 8/2018 | Avrahami | G06Q 10/06316 |
| 2019/0138457 | A1 * | 5/2019 | Kumar | G06F 3/0629 |

* cited by examiner

*Primary Examiner* — Kim T Nguyen
(74) *Attorney, Agent, or Firm* — Workman Nydegger

(57) ABSTRACT

In one example, a method includes monitoring data access operations concerning a document space, recording information identified as part of the monitoring of data access operations, evaluating the recorded information to identify a data access pattern concerning the document space, defining a document space configuration based on the data access pattern, and provisioning a document space based on the document space configuration. Provisioning of the document space can take the form of provisioning a newly created document space, or modifying the provisioning of an existing document space.

20 Claims, 5 Drawing Sheets

| Resource | URI | Rest operations | Notes |
|---|---|---|---|
| All document spaces | /documentSpaces | GET | List all document spaces you created or authorized |
| A document space | /documentSpaces/<documentSpaceId> | GET \| PUT \| PATCH \| DELETE | [De]provision and optimize a document space based on data access pattern |
| All document types | /documentSpaces/<documentSpaceId>/documentTypes [? Query_syntax] | GET | List all document types under a document space |
| A document type | /documentSpaces/<documentSpaceId>/documentTypes/<documentTypeId> | GET \| PUT \| DELETE | Create/Replace/Retrieve/Delete a document type Free schema design by default with the ability to define schema |
| All documents | /documentSpaces/<documentSpaceId>/documentTypes/<documentTypeId>/documents [? Query_syntax] | POST \| GET \| PUT \| DELETE | Bulk operation support on CREATE Support bulk operation on fetch/update/delete using search criteria |
| A document | /documentSpaces/<documentSpaceId>/documentTypes/<documentTypeId>/documents/<documentId> | GET \| PUT \| PATCH \| DELETE | Create/Retrieve/Update/Delete a document Support partial update on any field in the document |
| [? Query_syntax] | ? Filter=[field#1] lk "gold*" and [field2] gt 100&orderby=[field#1] ASC,[field2] DESC&page=1&pageSize=100 | | DellEMC standard REST query syntax |

*Figure 4*

SEARCH BUILT-IN AND COST EFFECTIVE DOCUMENT STORE AS A SERVICE

FIELD OF THE INVENTION

Embodiments of the present invention generally concern implementation and use of a document space such as may be employed by microservices in a data protection environment. More particularly, at least some embodiments of the invention relate to systems, hardware, computer-readable media, and methods directed to the provision, and use, of a document store as a service.

BACKGROUND

Entities typically generate and use data that is important in some way to their operations. This data can include, for example, business data, financial data, and personnel data. Accordingly, entities typically back up their important data so as to create a backup that can later be used in a data restore process if necessary. In some cases, entities use an off-premises platform, such as a cloud storage platform, for storage of the backup data. Processes such as reading, writing, and searching can be performed with respect to the stored backup data, and these processes may involve the use of a document space that includes documents, such as XML documents for example, employed by backup and restore applications. Operations that can be performed with respect to the documents in the document space may include creation, retrieval, updating, or deletion. While document spaces have generally proven useful, some problems nonetheless remain.

For example, typical document spaces lack flexibility in terms of the way in which they are accessed and used. That is, such document spaces tend to employ a one-size-fits-all approach to enabling access to the stored documents. This lack of flexibility, while arguably having some attraction from a programming perspective, results in inefficiencies in performing operations regarding the stored documents. These inefficiencies can have a negative impact with respect to the performance of search, backup, and restore operations that require the use of the stored documents.

Thus, what is needed are ways to improve access to, and the use of, a document space that includes documents used by backup and restore applications in a data protection environment. For example, it would be useful to provide systems and methods to enhance the flexibility and efficiency of the use of the document space and associated documents.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4 discloses some example REST operations that can be performed in connection with a document space.

DETAILED DESCRIPTION OF SOME EXAMPLE EMBODIMENTS

Figure 1:
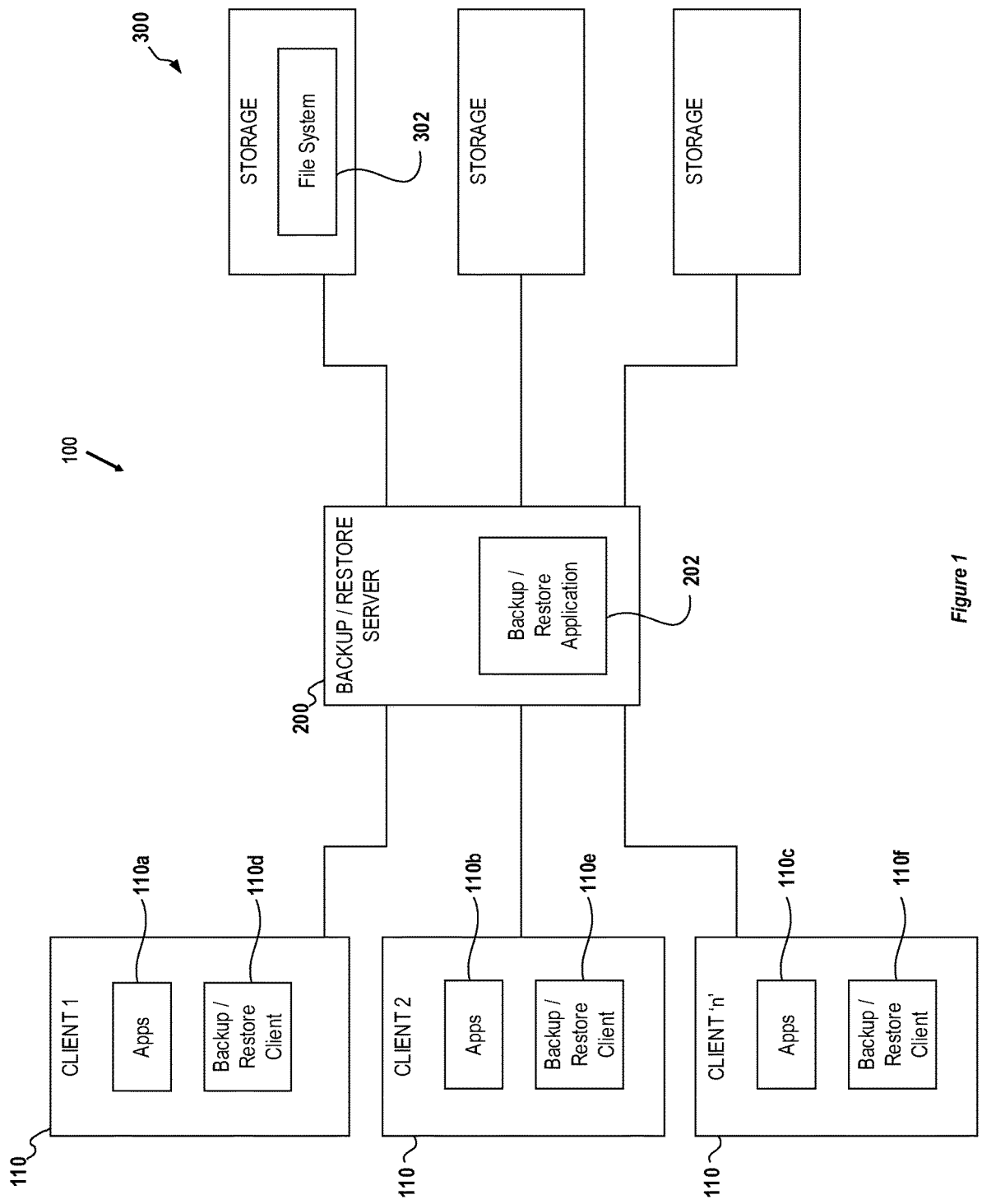
FIG. 1 discloses aspects of an example operating environment for at least some embodiments.

Embodiments of the present invention generally concern implementation and use of a document space such as may be employed by microservices, such as may be employed by backup and restore applications for example, in a data protection environment, such as a data storage environment where data backup and restore operations are performed. More particularly, at least some embodiments of the invention relate to systems, hardware, computer-readable media, and methods directed to the provision, and use, of a document store as a service (DSaaS), while the service itself may be referred to herein simply as the Document store service (DSS).

Embodiments of the invention can be employed in a variety of data storage environments, examples of which include, but are not limited to, cloud storage environments, public/private clouds, and/or on-premises storage environments, for example. The scope of the invention is not limited to any particular storage environment however.

Client data that is to be backed up and/or restored may be distributed across one or more storage environments and/or across different portions of a single storage environment. As well, embodiments of the invention may be employed in conjunction with backup and/or restore processes and associated applications, including backup and restore applications and associated backup and restore clients. These, and/or other backup and restore applications and clients may comprise, or consist of, data deduplication functions and processes and, as such, embodiments of the invention may be employed in connection with data deduplication processes and associated data deduplication file systems (FS), although that is not required.

In more detail, some example embodiments may be concerned with the use, such as by a backup and restore application for example, of a microservice such as the DSS. The microservice may include or employ a web service application program interface (API), such as representational state transfer (REST) API for example, that enables efficient searching and use of a document space holding documents needed by the backup and restore application to perform various data protection processes. Example embodiments of the REST API can implement and/or enable the implementation of optimized document access processes. For example, some embodiments provide a variety of different use cases based upon considerations such as data access patterns for example, that is, patterns that have historically occurred with regard to the searching and accessing of the document space. Such patterns can concern any aspect or attribute of one or more stored documents. Such patterns may be associated with one, or more, other document space(s) residing in the datastore accessed by the microservice, such as the DSS microservice for example.

As well, embodiments of the invention may provide various other functionalities as well including, for example, optimized namespace provisioning based on data access patterns. Embodiments of the invention may also support multi-tenancy configurations in which multiple different tenants or applications may need access to the document space and documents in the document space.

Some particular example embodiments employ a JavaScript Object Notation (JSON)-based document space. In general, JSON is a data format that involves the use of human readable text to transmit data objects. JSON can be used, for example, in asynchronous browser-server communications, and may serve as an alternative to the use of extensible markup language (XML). Such embodiments may also employ a flexible database system schema in which the organization of data serves as a basis for determining and implementing the structure of the database. Among other things, the schema may specify the information, such as attributes of documents for example, that can be stored in the document space. As well, searching of the document space can be performed using any suitable search engine. Thus, some embodiments employ Elasticsearch, which is a search engine product that provides a distributed, multitenant-capable full-text search engine with an HTTP web interface and schema-free JSON documents. Of course, the use of Elasticsearch is not required, and any other search engine of comparable functionality can alternatively be used. Advantageously, at least some embodiments of the invention can be automatically scaled out to meet changes in the number of tenants, the number of documents, the size of the document space, and/or any other variables or considerations. As well, embodiments of the invention provided for a document space that can include multiple document spaces, each of which may be customized to suit the particular needs of a user or tenant.

Finally, the overall architecture in example embodiments of the invention may include a variety of characteristics and attributes. For example, and as noted above, some embodiments may employ the Elasticsearch search engine. In particular, the Elasticsearch search engine can be used as both a backend datastore as well as a search engine, in some embodiments. As well, scale out functionality in at least some embodiments can be provided by Google Kubernetes which, in general, provides mechanisms for deploying, maintaining, and scaling applications. Particularly, the DSaaS can be deployed through Google Kubernetes as a microservice which may be hosted in a Docker container. In general, the Docker container combines software, such as the DSaaS microservice for example, in a complete filesystem that contains everything the software needs to run. In this way, the software will always run the same, regardless of the environment in which it is operating. As a final example of some aspects of the overall architecture of some embodiments of the invention, the DSaaS microservice can interact with other cloud services as well. Thus, for example, the DSaaS microservice can be integrated with an Identity and Access Management (IAM) authorization service to support multi-tenancy. That is, the IAM authorization service can serve to authenticate users, or tenants, before such tenants are allowed to make calls to the DSS microservice.

A. Example Operating Environments

In general, embodiments of the invention may include and/or be implemented in a data protection system operating environment that includes one or more storage systems or storage environments, various client systems and devices that generate data and perform, and/or request performance of, operations with respect to backed up data, such as search, read, and write operations. Such operations can be performed in connection with one or more data backup and/or data restore processes. Thus, processes such as are disclosed herein may be performed by a backup and restore application, which can be hosted on a server, that communicates directly or indirectly with one or more clients that generate and transmit read and write requests, although other applications could alternatively be employed. The backup and restore application may also communicate, directly or indirectly, with storage and/or storage servers in order to service client read and write requests directed to the storage and/or storage servers. As discussed in more detail in connection with FIG. 2, the backup and restore application may access and use various microservices that are needed to support backup and restore operations.

Example storage environments with which embodiments of the invention may be employed may take the form of a cloud storage environment, an on-premises storage environment, and hybrid storage environments that include public and private elements, although the scope of the invention extends to any other type of storage environment as well. More generally, embodiments of the invention can be implemented in any suitable environment and the scope of the invention is not limited to the example environments disclosed herein. Some particular embodiments of the invention may be used with the Google Cloud Platform, although the scope of the invention is not limited to that particular storage environment.

Any of the devices, including the clients, in the operating environment can be physical machines or virtual machines (VM), though neither type of machine is required for any embodiment. Similarly, data protection system components such as databases, storage servers, backup servers, and restore servers, for example, can likewise take the form of physical machines or virtual machines (VM), though neither type of machine is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Some example embodiments of the invention will be described with reference to a data storage system in the form of a storage system configured to store files, but it should be understood that the principles of the disclosure are not limited to this configuration. Rather, they are applicable to any system capable of storing and handling various types of objects, in analog, digital, or other form. Although terms such as document, file, or object may be used by way of example, the principles of the disclosure are not limited to any particular form of representing and storing data or other information. Rather, such principles are equally applicable to any object capable of representing information.

With reference now to FIG. 1, an example system 100 is disclosed that includes one or more clients 110, each of which can be any general purpose computing device, one example of which is discussed in FIG. 2 below. For example, one or more of the clients 110 may be a personal computer, workstation, handheld computer, smart phone, and/or tablet computer. The clients 110 may include applications 110a, 110b and 110c that generate, and/or cause the generation of, data that is desired to be backed, and later restored if necessary to the clients 110. To this end, the clients 110 may each include an instance of a backup/restore client 110d, 110e and 110f that cooperates with a backup/restore application, discussed below, to backup and restore data generated by one or more of the applications 110a-c.

The clients 110 may be in communication with a backup and restore server 200 over a network connection, such as a local area network ("LAN") or wide area network ("WAN"), or via any other form of communication or network. The clients 110 may interact with the backup and restore server 200 when there is a need to backup and/or restore client 110 data. Thus, the backup and restore server may host a backup and restore application 202 that cooperates with one or more of the backup/restore clients 110d-f to back up and/or restore client 110 data. The backup/restore processes can include read and write requests, examples of which are disclosed herein. In some cases, the backup/restore clients 110d-f can perform, or cause the performance of, data deduplication before, or as part of, a client 110 data backup process.

The backup and restore server 200 may communicate with storage 300, over any suitable network connection or other connection, to backup client 110 data to storage 300, and restore client 110 data from storage 300 to a client 110, based on client 110 read and/or write requests transmitted to the backup and restore server 200, and acted upon by the backup/restore application 202. More specifically, such client 110 read and write requests may be processed by the backup/restore application 202 using any of the methods and processes disclosed herein. In some embodiments the backup/restore application 202 may perform data deduplication before, or as part of, a process that backs up client 110 data. The storage 300 may include one or more instances of a filesystem 302 that catalogues files and other data residing in the storage 300.

The storage 300 can include any type or types of storage, examples of which include, but are not limited to, disk storage, SSD storage, and/or any other type of storage disclosed herein. In some cases, storage 300 can include a combination of magnetic and/or optical disk storage, and SSD storage, although no particular type of storage, or combination of storage types, is required by any embodiment of the invention. As well, the storage 300 can comprise, or consist of, one or more database servers.

Finally, the backup and restore server 200 and storage 300 may collectively comprise part, or all of, a data protection system. Such a data protection system can include additional elements as well. One example of such a data protection system is the EMC Corp. Data Domain system, although the scope of the invention is not limited to that example. Correspondingly, the filesystem 302 may, in some embodiments, take the form of a Data Domain Filesystem (DDFS), although that is not required.

B. Example Host Configuration

Figure 2:
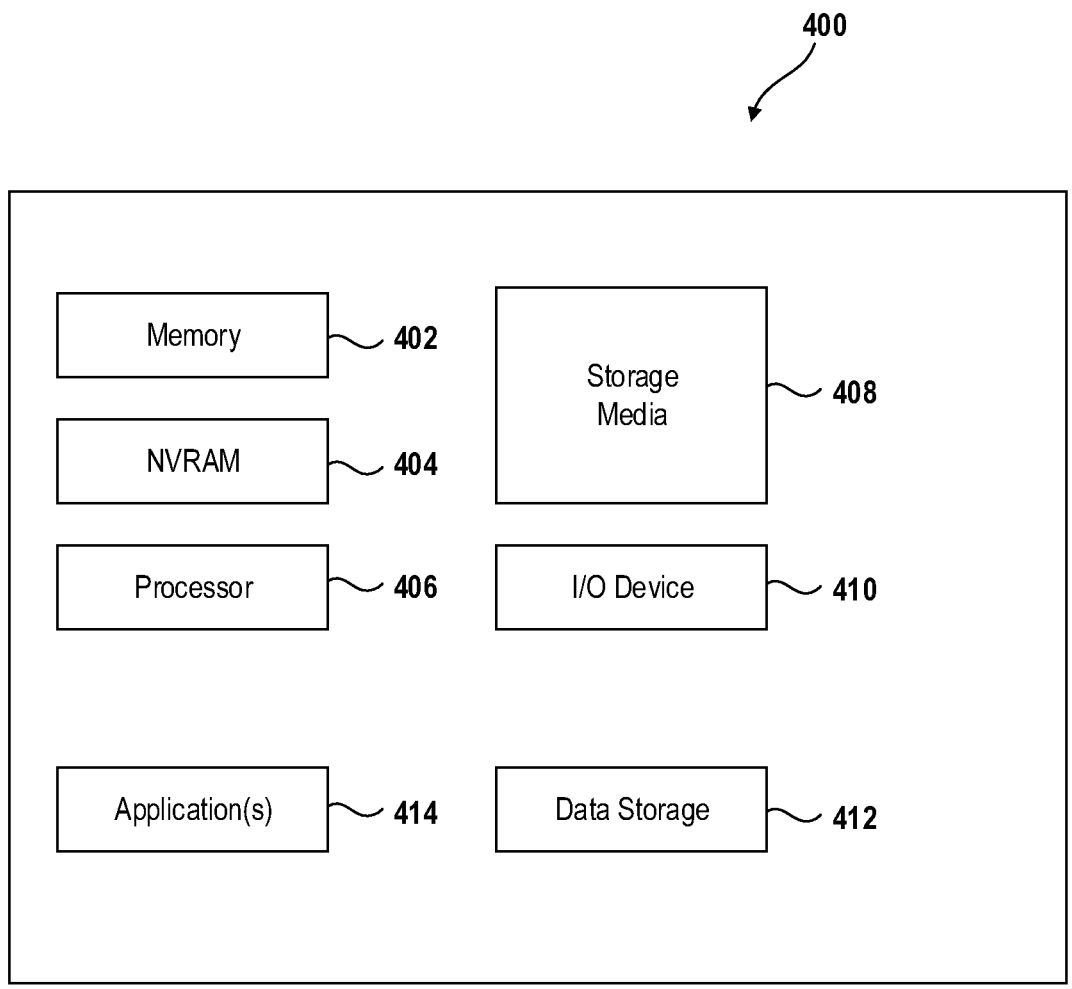
FIG. 2 discloses aspects of an example host configuration.

With reference briefly to FIG. 2, one or more of the clients 110, backup and restore server 200, and storage 300 can take the form of a physical computing device, one example of which is denoted at 400. In the example of FIG. 2, the physical computing device 400 includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components of the physical computing device can take the form of solid state device (SSD) storage. As well, one or more applications 414 are provided that comprise executable instructions. Such executable instructions can take the form, for example, of a backup/restore application 202 for example.

C. Example System Architecture

Figure 3:
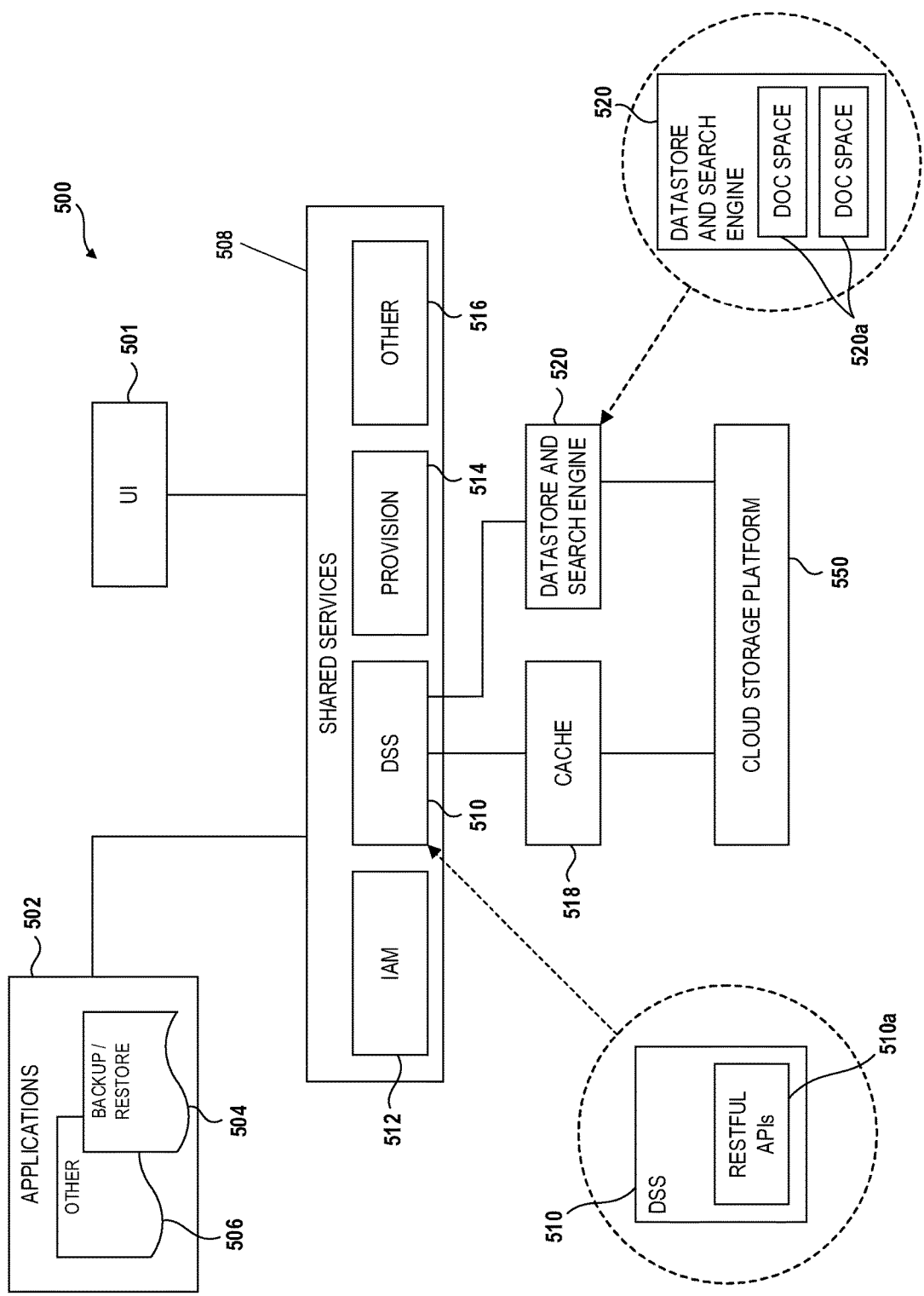
FIG. 3 discloses aspects of an example system architecture.

Direction attention now to FIG. 3, details are provided concerning an example system architecture 500 according to one or more embodiments of the invention. The architecture 500 can include various applications 502, such as a backup and restore application 504 for example, and any other applications 506. A variety of shared services 508 may be provided that can be used by any one or more of the applications 502 in connection with operations performed by and/or at the direction of the applications 502. The shared services 508 may be referred to as microservices. In general, the shared services can be employed in connection with backup and restore operations concerning data residing in storage, such as at a cloud storage platform 550.

One of the shared services 508 is a document store service (DSS) 510, which will be discussed in further detail below. Another example shared service 508 is an Identity and Access Management (IAM) authorization service 512 to support multi-tenancy. That is, the IAM authorization service 512 can serve to authenticate users, or tenants, before such tenants are allowed to make calls to the DSaaS microservice. As such, in at least some embodiments, the IAM service 512 can be integrated with the DSS 510. The shared services 508 may also include a provisioning service 514 that can be used to provision a namespace, or document space, where documents can be stored. Like the IAM service 512, the provisioning service 514 can be integrated, or at least operate in conjunction, with the DSS 510. Finally, the shared services 508 can include any other service 516 that may be needed by one or more of the applications 502.

With continued reference to FIG. 3, and directing attention to FIG. 4 as well, further details are provided concerning aspects of the DSS 510 and other shared services 508. For example, and as shown in FIG. 3, the DSS 510 may consist of, or comprise, a group of RESTful APIs 510a, each of which can support various operations that may be performed by, and/or at the direction of, the DSS 510. More specifically, the RESTful APIs 510a enable the DSS 510 to communicate, for example, with the cache 518 and datastore engine 520, discussed in more detail below. Some example REST operations and associated information are set forth in FIG. 4.

As shown in FIG. 3, the DSS 510 may access the cache 518 and a datastore 520. The cache 518 can take any suitable form. In some embodiments, the cache 518 may be a redis cluster, but that is not required. In general, redis (see https://redis.io/) is an open source, in-memory data structure store, that may be used as a database, cache and message broker. The use of a cache 518 by DSS 510 and other services is not required, but the cache 518 can boost performance of the DSS 510 by enabling high speed read and write processes that may be employed by the DSS 510. As well, the cache 518 can support execution state synchronization across all running instances of the DSS 510.

In general, the datastore 520 stores the documents needed by the DSS 510 which, as noted earlier, may perform various processes necessary to support the execution of data backup, search, and restore operations in a storage environment such as is disclosed in FIG. 1 for example. To this end, the datastore 520 includes a plurality of document spaces 520a. In general, and discussed in more detail below, the document spaces 520a may be created and employed to store documents needed by the DSS 510. In some embodiments, the datastore 520 may also include a search engine that can be used to query the document spaces 520a, as well as to store and retrieve documents to or from, as applicable, the document spaces 520a. As well, the document spaces 520a may include built-in document indexing capability.

In at least some embodiments, the datastore 520 and search engine can be implemented in the form of, or include, the Elasticsearch technology (https://www.elastic.co/products/elasticsearch), which is a distributed, RESTful search and analytics engine. However, alternative datastore and search engine technologies having functionality comparable to that of Elasticsearch can be employed for the datastore 520, and the scope of the invention is not limited to the use of Elasticsearch. Finally, some embodiments of the invention enable leveraging underneath Elasticsearch as a service (ESaaS) to scale out the Elasticsearch cluster or, more generally, the datastore 520.

With continued reference to FIG. 3, one, some, or all, of the document spaces 520a can be provisioned by way of the provisioning service 514. Provisioning can be performed in various ways, such as automatically based on historical and/or other information, and/or based on input from a user such as an administrator, by way of a user interface 501 for example. Information concerning access to the document spaces 520a, including historical information concerning access to the documents stored in the document spaces 520a, may reside in the cache 518 and/or at any other data storage location that is accessible by the provisioning service 514 and/or DSS 510. This information may be obtained from, or otherwise associated with, one, or more, other document space(s) residing in the datastore 520 accessed by the microservice, such as DSS 510 for example. The information can thus be obtained, for example, by monitoring calls from the DSS 510 to the datastore 520, and/or by accessing stored historical data concerning such calls.

In general, provisioning of the document spaces 520a can be optimized such that each document space is configured to suit various particular parameters. Examples of parameters which, alone or in combination with one or more other parameters, can be used as a basis for provisioning one or more document spaces include, but are not limited to, historical data access patterns concerning data expected to be stored in the document space, an expected maximum number of documents to be stored, time or user base data access, and physical or logical isolation of the document space. Further examples of parameters that can be used as a basis for provisioning a document space include any one or more attributes of documents that are to be stored. To illustrate, attributes such as the type, and size, of documents can be used as a basis for provisioning a document space.

It will be appreciated from the foregoing examples that embodiments of the invention possess a high degree of flexibility in terms of the attributes and parameters that can be used as a basis for provisioning one or more document spaces. As such, the scope of the invention is not limited to the foregoing examples but extends, more broadly, to any other attributes and parameters that may be used as a basis for provisioning a document space.

While the discussion has thus far concerned provisioning of document spaces, embodiments of the invention also embrace processes for modifying the provisioning of a document space, such as based on data access patterns for that document space, as well as processes for de-provisioning a document space. As well, bulk processes can be used to provision, modify, and de-provision multiple document spaces at the same time, or serially. Moreover, in some instances at least, the modification of the provisioning of any document space can be performed on-the-fly while the document space is in use.

Yet another useful aspect of embodiments of the invention concerns the ability to scale out, that is, change the size or capacity of, a document space in response to changing needs. Particularly, the size or capacity of a document space can be increased, or decreased, in response to a change in conditions. Scale out processes can be performed automatically based, for example, on the monitoring of read, write, and query transactions involving the DSS 520. As well, and with respect to the size or capacity of a document space, thresholds can be defined and implemented such that, for example, when the size or capacity of a document space exceeds a threshold, one or more similarly, or identically, provisioned document spaces can be automatically created. Thresholds need not be employed however and, in some embodiments at least, there is no limit to the extent to which a document space can be scaled out.

With continued reference to FIG. 3, embodiments of the invention enable a wide variety of processes and operations to be performed with respect to one or more documents associated with a document space and/or with respect to the document space itself. Such example processes and operations include, but are not limited to, 'get all document spaces,' 'get a document space,' 'create a document space,' 'patch a document space,' 'delete a document space,' 'get all document types under a document space,' 'get a document type,' 'create or replace a document type,' 'delete a document type and all its documents,' 'create a document,' 'perform bulk insert of documents,' 'search documents by criteria,' 'update documents by criteria,' 'delete documents by criteria,' 'get a document,' 'create or replace a document,' 'partially update a document,' 'delete a document,' and 'get documents applied to a specific resource.' Additional details concerning some of these example operations are set forth in FIG. 4.

As will be apparent from the present disclosure, embodiments of the invention may be advantageous for a variety of reasons, though no particular embodiment is required to possess or implement any of such advantages. To illustrate, some advantages of example embodiments of the invention may provide for a relatively flexible schema design. As well, searching of document spaces can be performed relatively quickly and cost effectively. Further, the document spaces can be constructed and provisioned to optimally support specific use cases, which can be based on an analysis of historical data. The document spaces can be scaled out to any level necessary to support operations. Moreover, the document spaces can be employed by multiple tenants or users. The document spaces and associated processes can be relatively user friendly inasmuch as such document spaces and processes can reduce or eliminate database/search technology learning curve and the need for expert level performance tuning.

D. Aspects of Example Methods

Figure 5:
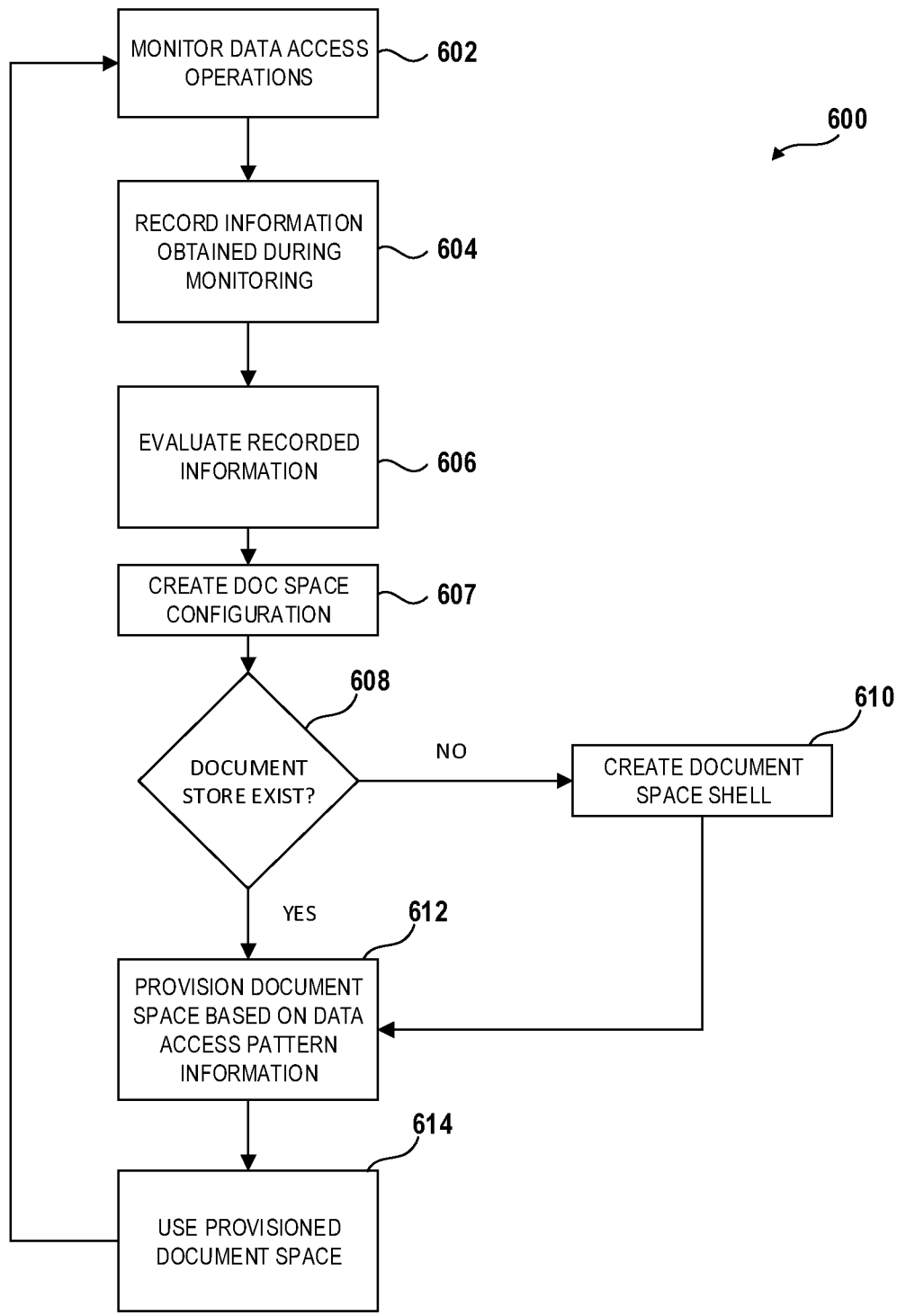
FIG. 5 is a flow diagram that discloses aspects of an example method for provisioning a document space.

With reference once again to FIGS. 1-4, and directing attention now to FIG. 5 as well, details are provided concerning an example method 600 for provisioning a document space, such as may be employed by a DSS microservice and/or other microservices. The example method 600 can begin with the monitoring 602 of data access operations concerning one or more document spaces and/or one or more associated documents. The monitoring can be performed by any suitable mechanism(s), and in some cases at least, can be performed automatically without requiring initiation by a user or other personnel. In some embodiments, the document spaces themselves may be configured to monitor access patterns regarding documents stored in the document spaces.

The data access information identified by the monitoring process can be recorded 604 for future use. Examples of such data access information include, but are not limited to: the number of IO operations per second (IOPS) on a per/document basis or a document space basis; the number of times a particular document is the subject of a requested operation; the number of times a particular type of document is the subject of a requested operation; the number of times a particular size, or range of sizes, of a document is the subject of a requested operation; the identity of the entity, or entities, reading a document; the number of document space search operations requested and performed over a given period of time; the number of unique documents read out; the number of operations requested by a particular user, or group of users; peak usage times for a particular document or document space; the amount of time needed to service a requested operation, such as a document query or read operation for example. More generally, the data access information that is monitored and recorded can be any information concerning one or more document spaces, and/ or one or more documents stored in such document spaces. As such, the scope of the invention is not limited to the illustrative examples noted above.

At such time as the data access information has been recorded 604, that information can then be evaluated 606. Such evaluation can include, for example, reviewing and analyzing the recorded information to identify one or more data access patterns concerning one or more documents and/or one or more document spaces. In some instances, the evaluation 606 can be an automated process performed by a computing entity, while in other cases, the evaluation 606 can be performed by a human, and, in still other instances, the evaluation 606 can be performed in part by a computing entity and in part by a human.

Using the results of the evaluation 606, a new or modified document space configuration that is consistent with those results can then be created 607. In general, this document space configuration defines how a document space shell will be provisioned. To illustrate an example of provisioning, the size of the document space can be based on a data access pattern that indicates a certain maximum number of documents are needed to be stored. As noted elsewhere herein, any other aspect of the document space can be created/ modified based on the outcome of the evaluation 606 of the recorded data access information. The document space configuration can be employed in whole or in part, depending upon the system needs and requirements.

For example, a check can be performed 608 to determine whether or not a document space conforming to the configuration generated at 607 exists. If no such document space exists, a document space shell can be created 610. On the other hand, it may be preferred to simply modify the provisioning of an existing document space to conform with the generated document space configuration. In either case, the method then proceeds to 612 where the new document space shell is provisioned, such as by a provisioning microservice for example, according to the document space configuration that was previously defined 607, or the provisioning of an existing document space is performed according to the document space configuration that was previously defined 607.

After provisioning, the document space can then be used 614 for query, read, and write operations, such as by one or more microservices. One of such microservices can be a DSS, although other microservices, examples of which are disclosed herein, may also use the document space. Operationally, the DSS may cooperate with the IAM microservice to authenticate users, or tenants, before such tenants are allowed to make calls, such as requests for documents, to the DSS microservice and associated document space.

Finally, the operational document space may be configured to monitor data access operations 602 relating to documents associated with the document space. Alternatively, the monitoring of data access operations 602 for the document space can be performed by another entity.

E. Example DSS API Specification

Aspects of example embodiments of a document store service (DSS) API are set forth in Appendix A hereto, entitled DOCUMENT STORE SERVICE API SPECIFICATION. Appendix A forms part of the present disclosure and is incorporated herein in its entirety by this reference.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    monitoring data access operations concerning a first document space;
    recording information identified as part of the monitoring of data access operations;
    evaluating the recorded information to identify a data access pattern concerning the first document space;
    defining a document space configuration based on the data access pattern; and
    provisioning a second document space based on the document space configuration, wherein the second document space comprises a container that groups a set of document types together, and the provisioning is based on attributes of documents that are to be stored in the second document space.

2. The method as recited in claim 1, wherein provisioning the second document space comprises provisioning a newly created document space shell, or modifying the provisioning of an existing document space.

3. The method as recited in claim 1, wherein provisioning of the second document space is performed by a document space microservice (DSS).

4. The method as recited in claim 1, wherein one of the data access operations concerns a backup operation or a restore operation.

5. The method as recited in claim 1, further comprising inserting a document into the second document space, and the document inserted in the second document space is usable by an application to perform a data protection process.

6. The method as recited in claim 1, further comprising performing an operation concerning a document residing in the second document space.

7. The method as recited in claim 1, wherein the second document space supports POST, GET, PUT, PATCH and DELETE operations.

8. The method as recited in claim 1, wherein the second document space supports multi-tenant access.

9. The method as recited in claim 1, wherein the data access pattern relates to any one or more of expected maximum documents, real-time performance, time-based access, user-based access, physical isolation, or logical isolation.

10. A non-transitory storage medium having stored therein computer-executable instructions which are executable by one or more hardware processors to perform operations comprising:
    monitoring data access operations concerning a first document space;
    recording information identified as part of the monitoring of data access operations;
    evaluating the recorded information to identify a data access pattern concerning the first document space;
    defining a document space configuration based on the data access pattern; and
    provisioning a second document space based on the document space configuration, wherein the second document space comprises a container that groups a set of document types together, and the provisioning is based on attributes of documents that are to be stored in the second document space.

11. The non-transitory storage medium as recited in claim 10, wherein provisioning the second document space comprises provisioning a newly created document space shell, or modifying the provisioning of an existing document space.

12. The non-transitory storage medium as recited in claim 10, wherein provisioning of the second document space is performed by a document space microservice (DSS).

13. The non-transitory storage medium as recited in claim 10, wherein one of the data access operations concerns a backup operation or a restore operation.

14. The non-transitory storage medium as recited in claim 10, further comprising inserting a document into the second document space, and the document inserted in the second document space is usable by an application to perform a data protection process.

15. The non-transitory storage medium as recited in claim 10, wherein the processes further comprise performing an operation concerning a document residing in the second document space.

16. The non-transitory storage medium as recited in claim 10, wherein the second document space supports POST, GET, PUT, PATCH and DELETE operations.

17. The non-transitory storage medium as recited in claim 10, wherein the second document space supports multi-tenant access.

18. The non-transitory storage medium as recited in claim 10, wherein the second document space is a JSON-based document store.

19. The non-transitory storage medium as recited in claim 10, wherein the second document space is part of a datastore that includes a search engine.

20. A physical computing device, wherein the physical computing device comprises:
    one or more hardware processors; and
    the non-transitory storage medium as recited in claim 10.

* * * * *